United States Patent
Poirier et al.

(10) Patent No.: US 9,025,242 B2
(45) Date of Patent: May 5, 2015

(54) INFRARED REFLECTOR WITH METALLIC SUBSTRATE COATED WITH A LAYER OF ZIRCONIUM AND CHROMIUM NITRIDE

(75) Inventors: Claire Poirier, Clermont-Ferrand (FR); Christophe Le Pen, Jallet (BE)

(73) Assignee: Arcelormittal Investigación y Desarrollo, S.L., Sestao Bizkaia (ES)

( * ) Notice: Subject to any disclaimer, the term of this patent is extended or adjusted under 35 U.S.C. 154(b) by 0 days.

(21) Appl. No.: 13/515,386

(22) PCT Filed: Dec. 17, 2009

(86) PCT No.: PCT/FR2009/001430
§ 371 (c)(1),
(2), (4) Date: Jul. 23, 2012

(87) PCT Pub. No.: WO2011/073537
PCT Pub. Date: Jun. 23, 2011

(65) Prior Publication Data
US 2012/0281276 A1  Nov. 8, 2012

(51) Int. Cl.
*G02B 5/08* (2006.01)
*F21S 8/10* (2006.01)
*F21V 7/22* (2006.01)
*G02B 1/10* (2006.01)

(52) U.S. Cl.
CPC ............ *G02B 5/0808* (2013.01); *F21S 48/1394* (2013.01); *F21V 7/22* (2013.01); *G02B 1/105* (2013.01); *G02B 5/08* (2013.01)

(58) Field of Classification Search
None
See application file for complete search history.

(56) References Cited

U.S. PATENT DOCUMENTS

| | | | |
|---|---|---|---|
| 4,358,507 A * | 11/1982 | Senaha et al. | 428/429 |
| 2004/0217290 A1* | 11/2004 | Davis et al. | 250/341.8 |
| 2009/0046356 A1 | 2/2009 | Sakaue et al. | |

OTHER PUBLICATIONS

Arcelor Technical Data Sheet. 10-2006-PR-TD-MCO-EN (Feb. 2006).*
International Search Report issued Jun. 30, 2010, in PCT/FR2009/001430.
Uwe Beck, et al., "Decorative hard coatings: advances in optical characterization techniques", Thin Solid Films, vol. 236, No. 1-2, XP 024732051, Dec. 15, 1993, pp. 184-190.
S. M. Aouadi, et al., "Physical and mechanical properties of chromium zirconium nitride thin films", Surface & Coatings Technology, vol. 200, No. 11, XP 024995485, Mar. 15, 2006, pp. 3411-3417.
Gridnev, V. N. et al:"Phase Equilibria and Mechanical Properties of Cr—Zr—N Alloys"; ISSN 0204-3580. Metallofizika. 1991. vol. 13, No. 4; pp. 106-112 and English Translation thereof (7 pages).

* cited by examiner

*Primary Examiner* — Stephone B Allen
*Assistant Examiner* — Jyotsna Dabbi
(74) *Attorney, Agent, or Firm* — Davidson, Davidson & Kappel, LLC

(57) ABSTRACT

An infrared reflector is provided. The infrared reflector includes a metallic substrate coated with a layer of zirconium and chromium nitride of general formula $(Zr_xCr_{1-x})_{1-y}N_y$ with x between 0.15 and 0.7 and y between 0.01 and 0.265. A method of manufacturing this infrared reflector is also provided.

20 Claims, 1 Drawing Sheet

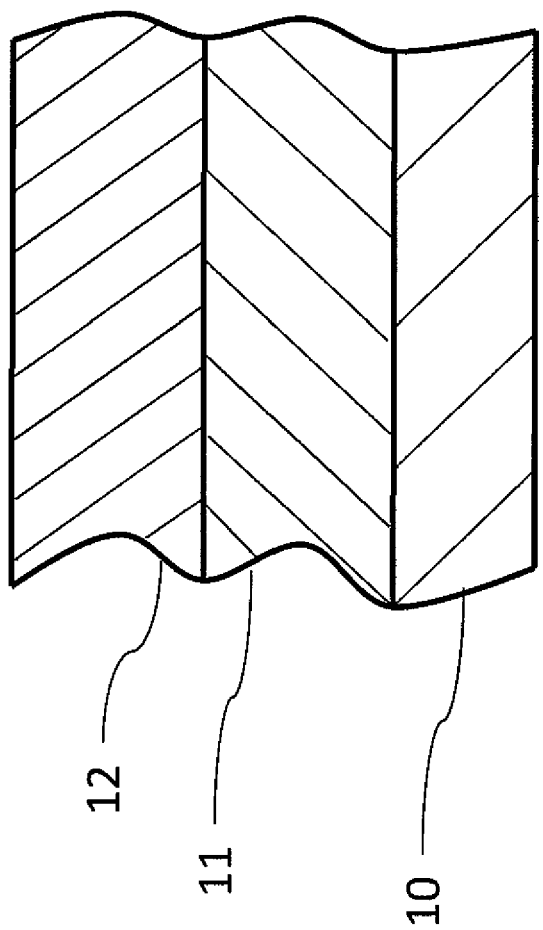

INFRARED REFLECTOR WITH METALLIC SUBSTRATE COATED WITH A LAYER OF ZIRCONIUM AND CHROMIUM NITRIDE

The present invention relates to the development of infrared reflectors.

BACKGROUND

One of the great global challenges of the 21st century is that relating to energy: production, distribution and consumption in a more efficient and more environmentally friendly manner. This challenge has become omnipresent in all economic sectors and influences future industrial activity for finding solutions with lower energy consumption.

In this context of reducing energy expenditure, coatings are sought that are able to confine a temperature rise in a cavity, i.e. are able to prevent energy loss to the exterior. For this, the coating must have high reflectivity of thermal radiation (near and medium infrared (IR) range). High reflectivity of thermal radiation means an average reflectivity of infrared radiation in the range 2.5-14.5 µm above 70%.

Generally, in a cavity such as for example a domestic electric oven or a car exhaust system, the walls absorb the infrared radiation emitted by the heating elements. They heat up and in their turn emit radiation extending to the longer wavelengths since their temperature is lower than that of the heating elements. This radiation will partly be absorbed by the objects arranged inside the cavity and the remainder will be absorbed again by the walls. Some of the thermal energy that is not radiated is transmitted by convection within the cavity and by conduction in the various layers constituting the wall, to the external wall of the cavity where it will be dissipated in the surrounding air by convection after raising the temperature of the various layers that it passes through. In order to limit the loss of energy to the exterior of the cavity and improve the energy performance of the equipment in question, one solution consists of trapping the infrared radiation within the cavity, which makes it possible to avoid the energy loss and optionally the recourse to the use of insulating foams. Metallic substrates, optionally metal-coated, are particularly ideal for this because of their high infrared reflectivity. However, there are many drawbacks to their use in this way:

Premature corrosion of the substrate such as in the case of a cold rolled steel (or black iron)

Corrosion in an alkaline medium such as in the case of aluminum or an aluminized coating Yellowing of the surface during the temperature rise such as in the case of a stainless steel Absence of cleanability of the surface in contact with dirt Tarnishing in a damp environment such as in the case of copper or aluminum.

To withstand high temperatures and corrosive and/or oxidizing environments, we generally make use of painted or enamelled surfaces. However, these surfaces have low infrared reflectivity and do not permit energy gains. In contrast, the use of metallic substrates, optionally metal-coated, as cavity walls offers energy gains of the order of 20% relative to painted or enamelled walls.

SUMMARY OF THE INVENTION

It is an object of the present invention to provide an infrared reflector having, simultaneously, high infrared reflectivity and good resistance to high temperatures and to corrosive and/or oxidizing environments. It has been designed and implemented for overcoming the drawbacks described above and far obtaining other advantages.

The present invention provides firstly an infrared reflector consisting of a metallic substrate, essentially characterized in that it is coated with a layer of zirconium and chromium nitride of general formula $(Zr_xCr_{1-x})_{1-y}N_y$, with x between 0.15 and 0.7 and y between 0.01 and 0.265.

The infrared reflector according to the invention can also comprise the following optional features, taken in isolation or in combination:

the layer of zirconium and chromium nitride is of thickness between 1 and 150 nm this layer has a proportion of zirconium, x, between 0.25 and 0.5 this layer has a degree of nitriding, y, between 0.1 and 0.25 the metallic substrate has an average reflectivity in the infrared in the range 2.5-14.5 µm between 80% and 99%.

the metallic substrate consists of steel covered beforehand:

a. with an aluminum alloy comprising from 8 to 11 wt.% of silicon and from 2 to 4 wt.% of iron, the remainder consisting of aluminum and inevitable impurities due to the processing b. or with a layer of aluminum, the remainder consisting of inevitable impurities due to the processing c. or successively with an aluminum alloy comprising from 8 to 11 wt.% of silicon and from 2 to 4 wt.% of iron, the remainder consisting of aluminum and inevitable impurities due to the processing and with a layer of aluminum alloy.

The infrared reflector can be used for making internal walls of a cavity, the latter preferably being a cooking oven or a car exhaust system.

It will therefore be understood that the solution to the technical problem posed consists of selecting a metallic surface having high infrared reflectivity and treating it with a deposit of zirconium and chromium nitride.

The invention relates secondly to a method of manufacturing an infrared reflector according to the invention, essentially comprising the steps according to which:

a metallic substrate is provided a layer of zirconium and chromium nitride is deposited on said substrate by a technique of physical vapor deposition, preferably by magnetron sputtering, using:

a. a target consisting of 15 to 70 wt.% of zirconium, the remainder consisting of chromium and inevitable impurities due to the processing b. injection of nitrogen, with a neutral carrier gas, in a ratio from 4/16 to 16/16, simultaneously with the deposition of zirconium and chromium.

Other features and advantages of the invention will become clear from the drawing and on reading the description given hereunder.

BRIEF DESCRIPTION OF THE DRAWING

FIG. 1 shows solely schematically an infrared reflector according to the present invention.

DETAILED DESCRIPTION

As shown schematically in FIG. 1, the infrared reflector according to the invention is constituted firstly of a metallic substrate 10, optionally metal-coated with a layer 11. Depending on the application and the performance required, the following may be used, but this list is not exhaustive: black iron, galvanized steel, steels coated with a zinc alloy comprising 5 wt.% of aluminum (Galfan®), steels coated with a zinc alloy comprising 55 wt.% of aluminum, about 1.5 wt.% of silicon, the remainder consisting of zinc and inevitable impurities due to the processing (Aluzinc®, Galvalume®), steels coated with an aluminum alloy comprising from 8 to 11 wt.% of silicon and from 2 to 4 wt.% of iron, the remainder consisting of aluminum and inevitable impurities due to the processing (Alusi®), steels coated with a layer of aluminum (Alupur®), stainless steels, aluminum, copper, steels coated successively with an aluminum alloy comprising from 8 to 11 wt.% of silicon and from 2 to 4 wt.% of iron, the remainder consisting of aluminum and inevitable impurities due to the processing (Alusi®) and a layer of an aluminum alloy of thickness between 20 and 60 nm. These various substrates have average reflectivities to infrared in the range 2.5-14.5 µm between 80 and 99%. Throughout the text, metallic substrate will mean metallic substrates 10 optionally coated with one or more layers of metal 11.

In the cavity, the walls may moreover be subject to harsh, aggressive conditions such as:
  a temperature rise up to 400° C.
  exposure to dirt of an aggressive nature
  exposure to alkaline environments All these conditions threaten the integrity of the outer layer of the infrared reflector.

Surprisingly, the inventors discovered that by coating a metallic substrate of high infrared reflectivity with a layer 12 of zirconium and chromium nitride, a substrate was obtained that was resistant to harsh conditions while retaining high infrared reflectivity.

The layer of zirconium and chromium nitride according to the invention can be obtained from an alloy consisting of 15 to 70 wt.% of zirconium, the rest of the composition consisting of chromium and inevitable impurities due to the processing. It was found that zirconium percentages below 15% or above 70% contributed to a deterioration in performance of the layer formed; notably, poor cleanability is observed with a zirconium percentage below 15% and poor temperature resistance with a zirconium percentage above 70%. As for the chromium, it contributes to the production of layers that are resistant to temperature and are of a dark color. The layer formed will therefore have a proportion of zirconium, x, between 0.15 and 0.7.

The layer can be deposited on the metallic substrate by all the techniques of vacuum deposition, among which we may mention as examples: magnetron sputtering PVD (physical vapor deposition), e-beam (electron beam), IBAD (ion beam assisted deposition), ion gun, JVD (jet vapor deposition), SIP (sputter ion plating).

Preferably, we shall start with a target consisting of 46 wt.% of zirconium and 54 wt.% of chromium ($Zr_{46}Cr_{54}$). In fact, the layers obtained starting from this alloy have a good compromise between the various characteristics that are required. As the settings during deposition of the layer have an influence on the percentages of zirconium and chromium effectively observed in the layer formed and as the precision of the measuring instruments introduces uncertainty in the values measured, preferably we shall aim at a proportion of zirconium, x, in the layer formed between 0.25 and 0.5.

During deposition, nitriding of the layer is effected by addition of nitrogen. This nitriding is indispensable for obtaining the desired properties. Nitrogen notably interferes with the transparency to infrared as well as with the color of the layer.

A very small amount of nitrogen incorporated is already sufficient for achieving satisfactory properties. For structural reasons, the amount of nitrogen incorporated should not exceed stoichiometry of the type $Me_3N_4$, where Me represents both zirconium atoms and chromium atoms. This stoichiometry corresponds to a maximum percentage of nitrogen by weight of 26.5%.

Preferably, incorporation of nitrogen will be carried out in such a way as to attain stoichiometry of the type MeN, with small variations of the type $MeN_{0.8}$ or $MeN_{1.2}$ around this desired stoichiometry being permissible. This stoichiometry, which displays an optimum for infrared reflectivity, corresponds to a percentage by weight of nitrogen between 10% and 25% depending on the relative percentages of zirconium and chromium.

The nitriding of the layer is controlled by the nitrogen flow rate, and more particularly by the ratio of the argon and nitrogen flow rates. As the relationship between the desired nitriding and the nitrogen flow rate is a function of the geometry of the deposition machine, the flow rate appropriate to the machine used can be selected on the basis of the general knowledge of a person skilled in the art. Deposition is carried out so that the zirconium/chromium alloy has a degree of nitriding, y, between 0.01 to 0.265 and preferably between 0.1 and 0.25.

As the transparency to infrared is a function of the layer thickness, this thickness is controlled so that the average reflectivity of the infrared reflector remains above 70%. Below this value, a surface is no longer considered to be an infrared reflector. The maximum thickness that should not be exceeded, in order to maintain sufficient transparency, depends on the metallic substrate in question and on the stoichiometry of the deposit formed. For each metallic substrate and each stoichiometry under consideration, a maximum thickness can be estimated by numerical simulation based on measurement of the real and imaginary optical indices of the layer formed, namely for each wavelength between 2.5 and 14.5 µm. As an example, in the case of a layer of zirconium and chromium nitride of general formula $(Zr_xCr_{1-x})_{1-y}N_y$, with x equal to 0.3 and y equal to 0.12, deposited on a substrate of Alusi®, this infrared reflectivity of 70% is obtained at a thickness of 150 nm, which will constitute the maximum thickness.

The infrared reflector according to the invention has the following characteristics:
  It has an average reflectivity close to that of the metallic substrate and above 70%
  It withstands exposure to 400° C.
  It can easily be cleaned if dirty
  It can withstand alkaline environments The following additional advantages have also been found:
  The layer of zirconium and chromium nitride improves the resistance of the metallic substrate to atmospheric corrosion
  This layer is of a dark gray-blue hue for a thickness below 40 nm and an anthracite gray hue for a larger thickness. This anthracite gray hue facilitates the use of this layer for applications of the domestic electric oven type, where dark layers are preferred. It can also be a plus for decorative applications.

To illustrate the invention, tests were carried out, and will be described as nonlimiting examples.

Tests

The thickness of the deposit is estimated as follows: during preparation of the deposit, once all the deposition variables (namely type of machine, composition of the target, intensity applied and gas flow rates) have been selected, deposition is carried out on partially masked silicon for a fixed time. The thickness variation between the masked part and the non-masked part of the silicon is then measured by means of a profilometer of the Dektak type. The operation is repeated for different deposition times. The rate found by linear regression is then used for selecting the deposition time as a function of the desired thickness, for the same set of variables.

The reflectivity is measured by means of an integrating sphere covered with so-called Infragold® material. A beam, of a given wavelength, incident at an angle of 8° is reflected by the sample whose reflectivity is to be measured, then integrated by the sphere and measured by means of a spectrometric sensor. An average reflectivity can be found by scanning at wavelengths between 2.5 and 14.5 µm. Calibration is carried out by means of references certified by a metrology organization.

The temperature resistance is evaluated by exposing the infrared reflector to 400° C. for four hours. Any oxidation of the outer layer of the reflector shows up as a color change. If the color change is imperceptible to the naked eye, it is quantified by comparative measurement with a spectrocolorimeter. The difference between initial hue and final hue is expressed as $\Delta a^*$ and $\Delta b^*$ in the colorimetric space CIE 76 $L^*a^*b^*$. In the case of the present invention, the temperature resistance is deemed satisfactory when $\Delta a^*$ and $\Delta b^*$ remain below 2. After exposure to 400° C. for four hours, it is also verified that the infrared reflectivity has not been altered.

The ease of cleaning can be expressed by the possibility of easily removing carbonized elements on the outer layer of the infrared reflector. The system for evaluating the ease of cleaning makes it possible to quantify the capacity of this layer to regain its original appearance after use. The system for evaluation comprises the following steps:

In the case of the present invention, the ease of cleaning is deemed satisfactory when the average score obtained for all of the foodstuff mixtures is strictly above 3.

The resistance in an alkaline environment is evaluated by bringing the outer layer of the infrared reflector in contact with an oven cleaner of the Decap'four® type. The resistance in alkaline environment is deemed satisfactory if this contact does not cause any change of the layer.

The degree of nitriding and the proportion of zirconium in the layer formed are measured by XPS spectroscopy.

EXAMPLES

The examples of carrying out the invention relate to deposition by magnetron sputtering PVD of a layer of zirconium and chromium nitride of general formula $(Zr_xCr_{1-x})_{1-y}N_y$ on Alusi® substrate.

In a vacuum chamber at a base pressure of $10^{-6}$ mbar, argon and nitrogen are introduced in known amounts, depending on the geometry of said chamber. A plasma is generated between the substrate and a target of $Zr_xCr_{1-x}$ in magnetron mode owing to a potential difference applied via a generator applying a power of 360 W. The Zr and Cr atoms are stripped from the target and are projected onto the substrate.

Table 1 summarizes the characteristics of some layers formed and the properties obtained.

TABLE 1

| | Test No. | | | | | | |
|---|---|---|---|---|---|---|---|
| | 1 | 2 | 3 | 4 | 5 | 6 | 7 |
| Composition of the target | Alusi AS120 bare | Zr—Cr (46%-54%)* | Zr—Cr (46%-54%)* | Zr—Cr (46%-54%)* | Zr—Cr (46%-54%)* | Zr—Cr (86%-14%) | Zr—Cr (86%-14%) |
| Ratio of $Ar/N_2$ flow rates | / | 16/8 | 16/4 | 16/16 | 16/8 | 16/8 | 16/4 |
| Thickness (nm) | / | 40 | 60 | 60 | 150 | 45 | 50 |
| Infrared reflectivity | 92% | 90% | 73% | 77% | 70% | 90% | 85% |
| Temperature-resistant | Yes | Yes | Yes | Yes | Yes | No | No |
| Ease of cleaning | 3 | 4 | 4 | 4 | 4 | 4 | 4 |
| Alkaline resistance | No | Yes | Yes | Yes | Yes | Yes | Yes |
| Hue | / | Gray-blue | Gray | Gray | Gray | Blue | Blue-violet |

(*= infrared reflector according to the invention)

The surface is covered locally with a mixture of foodstuffs (egg yolk, salted milk, lemon juice, ketchup or jam)

This mixture is carbonized in an oven, heating it to 200° C. for 10 min, the time for temperature rise being 25 min After cooling, gradual cleaning is carried out, in order to remove the carbonized mixture as far as possible The ease of cleaning is scored as follows:
a. 5: surface cleanable with a dry cloth
b. 4: surface cleanable with the soft face of a wetted sponge
c. 3: surface cleanable with the abrasive face of a wetted sponge
d. 2: surface cleanable with the soft face of a wetted sponge and an oven cleaner of the Decap'four® type
e. 1: surface cleanable with the abrasive face of a wetted sponge and an oven cleaner of the Decap'four® type
f. 0: surface cannot be cleaned.

It is found that only the layers according to the invention have the desired technical characteristics. In fact:

In the case of an Alusi substrate that is not coated with a layer of zirconium and chromium nitride, the alkaline resistance and ease of cleaning are not satisfactory In the case of the $Zr_{86}$-$Cr_{14}$ alloy, the layer does not have satisfactory temperature resistance In the case of the $Zr_{46}$-$Cr_{54}$ alloy, as illustrated by test No.5, a thickness greater than 150 nm will not allow sufficient infrared reflectivity to be maintained, namely above 70%.

Moreover, measurements by XPS spectroscopy were able to verify that the layers according to the invention had degrees of nitriding of the order of 0.1-0.15 and proportions of zirconium of the order of 0.25-0.35.

It is to be understood that the fields mentioned in the context of this description constitute an illustration and not a limitation of the invention. The invention can be applied in other fields where we wish to control the reflective properties of a surface, such as those of selective solar absorbers, heat screens of automobile engines, headlamp shields, etc.

The invention claimed is:

1. An infrared reflector, comprising: a metallic substrate; and a layer coated on the metallic substrate comprising a zirconium and chromium nitride of formula (I):

$$(Zr_xCr_{1-x})_{1-y}N_y \quad (I),$$

wherein x is in a range from 0.15 to 0.5, x being a weight proportion of Zr in a zirconium chromium alloy, and y is in a range from 0.01 to 0.265, y being a weight proportion of N.

2. The infrared reflector of claim 1, wherein the layer has a thickness in a range from 1 to 150 nm.

3. The infrared reflector of claim 1, wherein in formula (I), x is in a range from 0.25 to 0.5.

4. The infrared reflector of claim 1, wherein, in formula (I), y is in a range from 0.1 to 0.25.

5. The infrared reflector of claim 1, wherein the metallic substrate has an average reflectivity from 80% to 99% in an infrared range of 2.5-14.5 μm.

6. The infrared reflector of claim 5, wherein the metallic substrate comprises a steel coated with an aluminum alloy comprising aluminum, from 8 to 11 wt. % of silicon, and from 2 to 4 wt. % of iron.

7. The infrared reflector of claim 5, wherein the metallic substrate comprises a steel coated with a layer of aluminum.

8. The infrared reflector of claim 5, wherein the metallic substrate comprises a steel coated successively with (i) an aluminum alloy comprising aluminum, from 8 to 11 wt. % of silicon, and from 2 to 4 wt. % of iron, and (ii) a layer of an aluminum alloy having a thickness between 20 and 60 nm.

9. A method of manufacturing the infrared reflector as recited in claim 1, the method comprising: depositing, by physical vapor deposition, the layer of zirconium and chromium nitride on the metallic substrate.

10. The method of claim 9, wherein the deposition is performed by magnetron sputtering.

11. The infrared reflector of claim 1, in the form of an internal wall of a cavity.

12. The infrared reflector of claim 11, wherein the cavity is a cooking oven.

13. The infrared reflector of claim 11, wherein the cavity is a car exhaust system.

14. The infrared reflector of claim 1, wherein, in formula (I), x is in a range from 0.25 to 0.5 and y is in a range from 0.1 to 0.25.

15. The infrared reflector of claim 2, wherein, in formula (I), x is in a range from 0.25 to 0.5 and y is in a range from 0.1 to 0.25.

16. The infrared reflector of claim 14, wherein the metallic substrate has an average reflectivity from 80% to 99% in an infrared range of 2.5-14.5 μm.

17. The infrared reflector of claim 15, wherein the metallic substrate has an average reflectivity from 80% to 99% in an infrared range of 2.5-14.5 μm.

18. The infrared reflector of claim 16, wherein the metallic substrate comprises a steel coated with an aluminum alloy comprising aluminum, from 8 to 11 wt. % of silicon, and from 2 to 4 wt. % of iron.

19. The infrared reflector of claim 17, wherein the metallic substrate comprises a steel coated with an aluminum alloy comprising aluminum, from 8 to 11 wt. % of silicon, and from 2 to 4 wt. % of iron.

20. The infrared reflector of claim 16, wherein the metallic substrate comprises a steel coated with a layer of aluminum.

* * * * *